United States Patent [19]

Vogler

[11] Patent Number: 4,586,369
[45] Date of Patent: May 6, 1986

[54] METHOD AND APPARATUS FOR DETERMINING CYLINDERS OPERATING WITH IRREGULAR COMBUSTION OF AN INTERNAL COMBUSTION ENGINE

[75] Inventor: Günther Vogler, Kernen, Fed. Rep. of Germany

[73] Assignee: Daimler-Benz Aktiengesellschaft, Fed. Rep. of Germany

[21] Appl. No.: 665,399

[22] Filed: Oct. 26, 1984

[30] Foreign Application Priority Data

Oct. 27, 1983 [DE] Fed. Rep. of Germany ....... 3338959

[51] Int. Cl.⁴ .............................................. G01M 15/00
[52] U.S. Cl. .................................................. 73/117.3
[58] Field of Search ...................... 73/116, 660, 117.3; 123/436

[56] References Cited

U.S. PATENT DOCUMENTS 4,513,721 4/1985 Ina et al. ........................ 123/436 X

FOREIGN PATENT DOCUMENTS 2912773 10/1980 Fed. Rep. of Germany ..... 73/117.3

Primary Examiner—Jerry W. Myracle
Attorney, Agent, or Firm—Craig & Burns

[57] ABSTRACT

A method for determining cylinders operating with irregular combustion of an elastically supported internal combustion engine, by means of which the faulty cylinder or cylinders can be recognized from the vibration velocity taking place at the repetition frequency and from the vibration distance traversed at the natural frequency of the internal combustion engine, in each case in relation to vibrations about the axis of rotation of the internal combustion engine, and from a synchronizing pulse coordinated to the operating cycle. Additionally, the invention also indicates an apparatus to carry out the method.

10 Claims, 4 Drawing Figures

METHOD AND APPARATUS FOR DETERMINING CYLINDERS OPERATING WITH IRREGULAR COMBUSTION OF AN INTERNAL COMBUSTION ENGINE

The present invention relates to a method for determining cylinders operating with irregular combustion of an elastically supported multi-cylinder internal combustion engine, especially of an internal combustion engine operated during idling in a motor vehicle.

The present invention also relates to an apparatus for carrying out this method.

In modern Otto-engines having an idling rotational speed which is low for consumption and exhaust gas reasons and with a CO adjustment as well as with a relatively early or advanced idling-ignition instant, idling shaking occurs frequently. This involves sporadically occurring so-called combustion misfirings or cut-outs. As a rule, no faults can be determined with test equipments available customarily in workshops. Since a number of causes may be involved which amplify cyclic fluctuations (cylinder, respectively, valve tightness, mixture distribution, valve clearance, overlap of the valve openings, spark plug electrode distance, injection behavior of the injection nozzles, etc.), it is of assistance in the fault detection if it is known in which cylinder combustion misfirings occur.

Ignition misfirings can be taken care of as a rule with engine testers, for example, oscilloscopes available customarily in workshops; however, this is not the case with combustion misfirings or cutouts.

Since strong HC increases occur in the exhaust gas in case of combustion misfirings, it is possible to determine the misfiring cylinders by means of individual measuring places in the exhaust elbow by means of an HC measuring apparatus. This method, however, is too costly for the workshop practice since the internal combustion engine has to be equipped at first with measurement elbows. Additionally, HC measuring apparatus are rarely present in workshops and are relatively expensive.

Accordingly, it is the object of the present invention to indicate a method which enables in a simple manner the determination of cylinders in which combustion misfirings occur. It is also the object of the present invention to provide an apparatus for carrying out this method which can be handled in a simple manner and can be manufactured price-favorably. The underlying problems are solved according to the present invention in that the amplitude of a vibration velocity signal which is filtered out of the vibration velocity of the engine vibrations or oscillations taking place about the axis of rotation of the internal combustion engine, which occurs during the combustion processes in the cylinders and which alternates with the repetition or operating frequency of the internal combustion engine, a synchronizing pulse coordinated to a predetermined angular position of each operating cycle of the internal combustion engine and the amplitude of a vibrational distance signal coordinated to the vibration distance of the engine vibrations which take place about the axis of rotation of the internal combustion engine, are plotted as a function of time, and in that the cylinder or cylinders determined from the position of the synchronizing pulse have an irregular combustion whose coordinated amplitude or amplitudes of the vibration velocity signal are marketly smaller than the amplitude or amplitudes coordinated to the other cylinders and some of the amplitudes of the vibration distance signal following in time are markedly larger than the amplitudes occurring during normal combustion. With an apparatus according to the present invention, the underlying problems are solved in that a velocity pickup is arranged at the engine block of the internal combustion engine whose output signal is fed by way of a band filter matched to the repetition or operating frequency of the internal combustion engine, and that a distance pickup is also arranged at the engine block and in that a synchronizing pulse pickup is provided and in that a multi-channel indicating apparatus with at least two channels is provided, to the inputs of which are connected at least the output of the band filter and the output of the distance pickup, and in that the output of the synchronizing pulse pickup is connected with a further channel or with an input of a summing member which is interconnected by way of its second input and its output in the input line of the first or second channel.

By measuring the engine vibrations, for example, at the cylinder head of the internal combustion engine transversely to the axis of rotation thereof, which is to be thought of approximately in the driving direction, and by an appropriate signal preparation, it is possible to carry out a cylinder output comparison which provides an indication for individual combustion misfirings or cutouts. Meaningfully, this method is applied only when the ignition misfirings cannot be determined notwithstanding idling shakings or vibrations.

The crankshaft of the internal combustion engine is accelerated in the direction of rotation and the crankcase is accelerated opposite the direction of rotation by the combustion pressure during the operating cycle. The friction moment, the compression pressure, etc., in contrast thereto, decelerate the rotation of the crankshaft and accelerate the crankcase in the direction of rotation. The attainment of the maximum vibration velocity describes the equilibrium condition between acceleration and deceleration of the crankcase. All parts rigidly connected with the engine block, properly speaking, such as the cylinder head, suction system, etc., are to be understood by the term crankcase. The position of the axis of rotation is determined by the elastic engine support and is subjected to dynamic changes.

Since the deceleration moments are subjected only to slight cyclic fluctuations, changes of the maximum vibration velocity can be traced back essentially to changes of the combustion process.

Since the engines are supported in the vehicles by means of an elastic "soft" suspension, the natural frequency of the shaking movements of the engine lies considerably lower than the (operating) repetition frequency determined by the rotational speed and cylinder number. For example, the natural frequency of a known six-cylinder engine lies at 10 Hz whereas the repetition frequency lies at 37.5 Hz at a rotational speed of 750 rpm.

The crankcase vibrates therefore with its own natural frequency when the engine is running. A vibration caused by the combustion processes in the cylinders and taking place with a higher repetition frequency is superimposed on this vibration. With normal combustion, the superimposed vibration takes place with approximately equally large velocity amplitudes.

With a poor combustion or with a combustion that has not taken place at all, the crankcase receives only a small pulse or no pulse at all, which entails a strongly reduced vibration velocity. As a consequence of such a combustion misfiring, the engine shakes or vibrates with considerably larger deflections about the normal position until the dynamic equilibrium condition again adjusts itself during normal combustion.

The method according to the present invention for the determination of cylinders operating with irregular combustion now consists in plotting as a function of time the vibration velocity of the crankcase which takes place with the repetition frequency, by means of a synchronizing pulse, for example, by means of the ignition pulse of the first cylinder, for the identification of the velocity peaks caused by the individual cylinders operating in the ignition sequence and in parallel thereto the vibration distance of the crankcase taking place at its natural frequency.

That cylinder or those cylinders are determined in this diagram as the cylinder or cylinders operating with misfiring or cutout combustion, whose coordinated vibration velocity amplitude is markedly smaller than the remaining ones and whereby the vibrational distance amplitudes which follow these combustion misfirings in time, are markedly larger than the amplitudes occurring during normal combustion.

These and other objects, features and advantages of the present invention will become more apparent from the following description when taken in connection with the accompanying drawing which shows, for purposes of illustration only, one embodiment in accordance with the present invention, and wherein.

Figure 1:
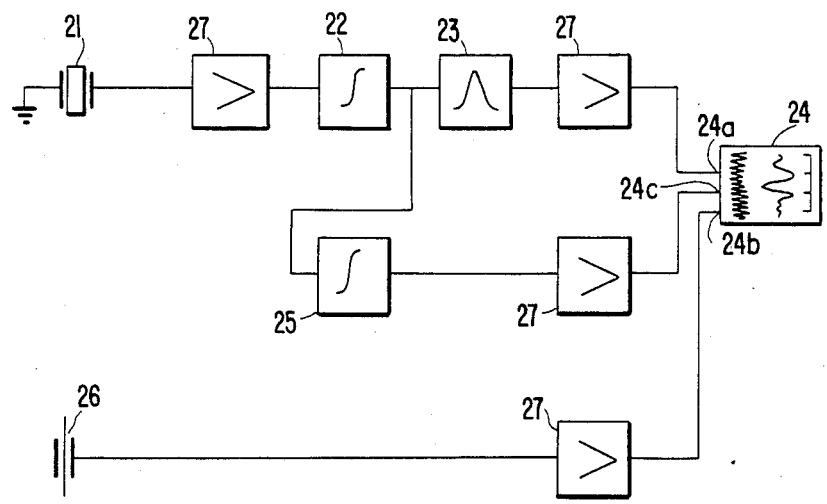
FIG. 1 is a schematic block diagram of an apparatus in accordance with the present invention.

The schematic construction of an apparatus for carrying out the method in accordance with the present invention is illustrated in FIG. 1.

An acceleration transducer or pickup 21 to be secured at the engine block is connected by way of a matching amplifier 27 with the input of the integrator 22. A bandpass filter 23 follows the integrator 22, whose output leads by way of a further matching amplifier 27 to the input 24a of the first channel of a three-channel continuous line recorder 24. The output of the first integrator 22 is additionally connected with the input of a second integrator 25 whose output leads, also by way of a matching amplifier 27, to the input 24c of the second channel of the recorder 24. For example, an inductive or capacitive ignition voltage pickup 26 is placed as synchronizing pulse pickup about the ignition cable leading to the spark plug of the first cylinder firing in the sequence of the operating cycle, whose output is again connected by way of matching amplifier 27 with the input 24b of the third three-channel recorder 24.

The acceleration pickup 21 secured at the cylinder head transmits signals by way of the matching amplifier 27 to the input of the integrator 22, when the internal combustion engine rotates at idling speed, which reproduce the acceleration of the crankcase that vibrates about its normal position. A velocity signal is formed from this acceleration signal by the integration in the integrator 22. This signal corresponds to the overall vibration of the crankcase, i.e., to the vibrations taking place at the natural frequency, whereby the vibrations taking place at the higher repetition frequency are superimposed on the vibrations taking place at the natural frequency.

For separating both vibration signals, the velocity signal coming from the integrator 22 is conducted by way of the bandpass filter 23 matched to the repetition frequency, at the output of which now appears a signal corresponding to the velocity of the vibrations taking place at the repetition rate, which is fed by way of a matching amplifier 27 to the input 24a of the three-channel line recorder 24 and is plotted by the recorder in the first channel as a function of time.

The velocity signal coming from the first integrator 22 is once again integrated in the second integrator 25 so that in the output thereof appears a signal coordinated to the vibration distance of the crankcase, which is plotted as a function of time in the second channel of the three-channel recorder 24.

For the identification of the velocity peaks coordinated to the individual cylinders, the pulse produced by the ignition voltage pickup 26 and corresponding to the ignition pulse of the first cylinder is plotted as a function of time in the third channel. The velocity peak coordinated to this cylinder and plotted in the first channel is offset by about 120 degrees crankshaft with respect to the ignition pulse, respectively, the synchronizing pulse plotted in the third channel so that an equivocal coordination is possible. The velocity peaks plotted in the first channel with a six-cylinder engine and lying between two synchronizing pulses plotted in the third channel are therefore coordinated, corresponding to the ignition sequence, to the cylinders 1, 5, 3, 6, 2 and 4.

Figure 2:
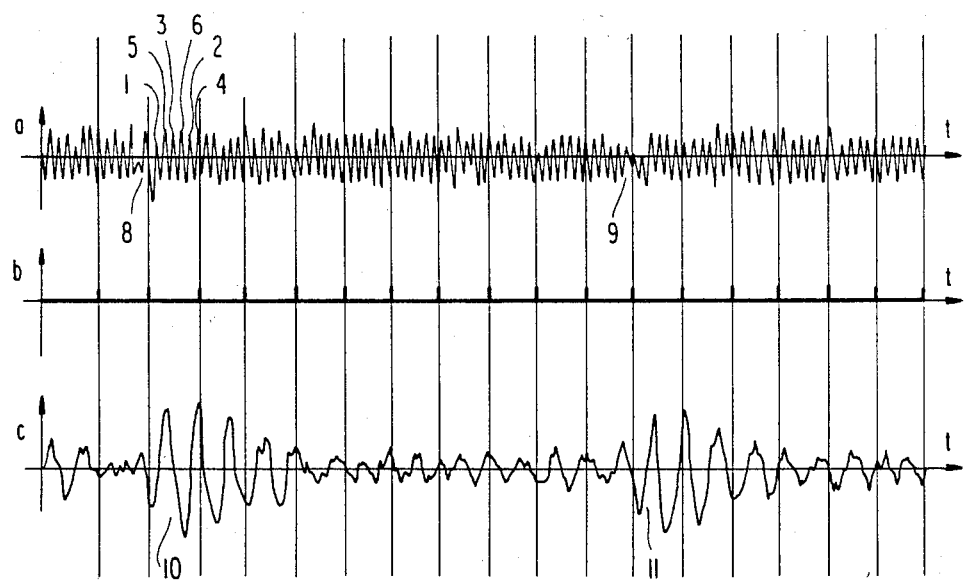
FIG. 2 is a diagram with the curves plotted by means of the apparatus in accordance with the present invention.

The synchronous curves in the three channels which are plotted with an idling internal combustion engine having ignition misfirings in a cylinder, are illustrated in FIG. 2. The velocity curve oscillating with the repetition rate is plotted as curve a, the synchronizing pulse curve is plotted as curve b, and the oscillating curve oscillating with the natural frequency is plotted as curve c.

The velocity peaks coordinated to the individual cylinders are designated once by the numbers indicated and repeat themselves cyclically.

At the velocity peaks designated by reference numerals 8 and 9 and coordinated to the cylinder number 2, a markedly smaller amplitude can be noticed, which stems from combustion misfirings, as also the deflections of the vibration curve following the same with respect to time and designated by reference numerals 10 and 11, which represent the idling shaking, properly speaking. It can thus be seen unequivocally from the plotted curves that combustion misfirings take place in cylinder number 2.

Figure 3:
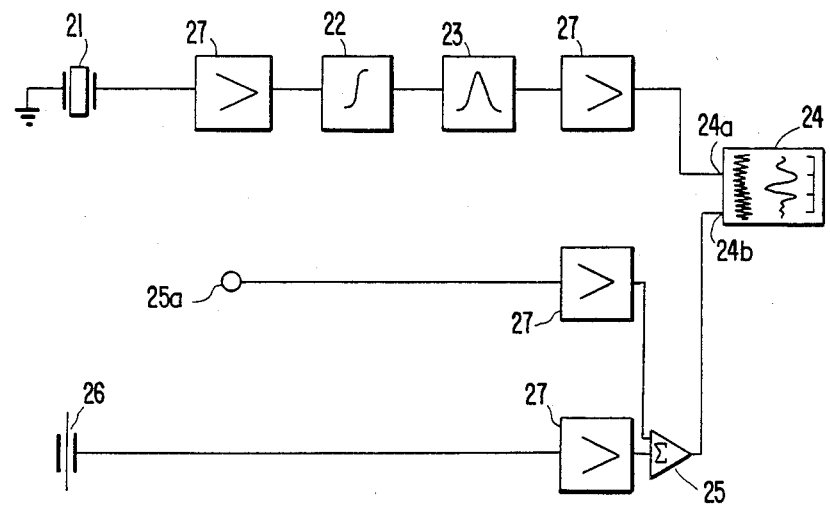
FIG. 3 is a schematic block diagram of a modified embodiment of the device of FIG. 1.
Figure 4:
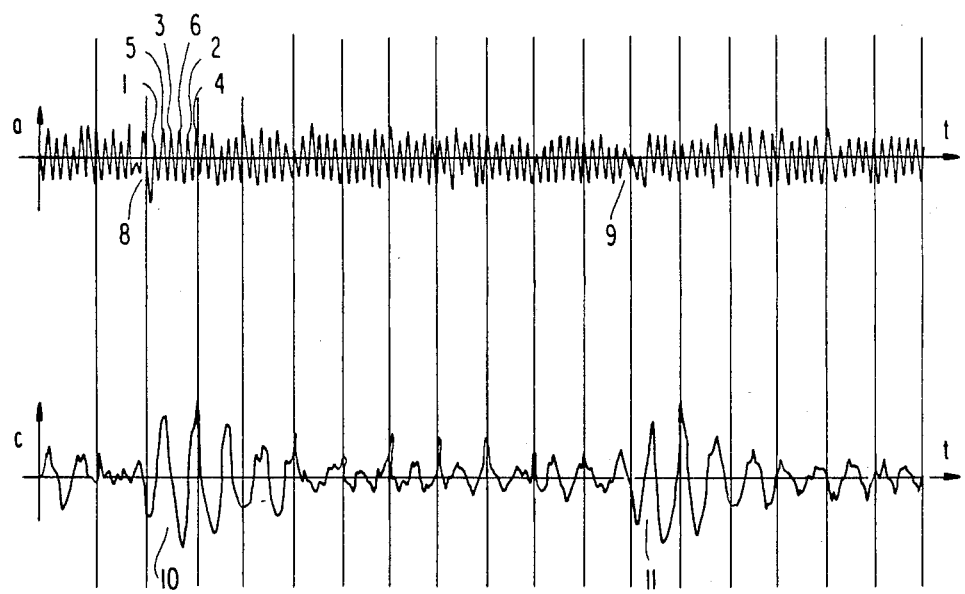
FIG. 4 is a diagram with the curves plotted by means of the modified embodiment of the device.

The solution preferred herein to utilize an acceleration pickup and two integrators can also be replaced by separate pickups for vibration velocity and vibration distance. Similarly, the synchronizing pulse, in lieu of being derived from an ignition pulse, can be derived also from the movement of an inlet or exhaust valve or from a fuel injection operation (for example, with diesel engines). However, it is also possible to save one channel of the recorder in that the synchronizing pulse is superimposed on the vibration velocity signal or the vibration distance signal. Such a system is shown in FIG. 3, wherein the distance pickup occurs at sensor 25(a) arranged at the engine block and led to amplifier 27. This signal is then joined at summing mechanism 25 with the synchronizer input 26 after passing through its amplifier 27 before being transmitted to channel 24(b) of recorder 24. The corresponding curve for this hook-up is shown in FIG. 4.

Engine testers customarily available in workshops can be expanded in an economical manner with the apparatus described in accordance with the present invention. However, also a digital data processing is feasible within the scope of the present invention in such a manner that the peak values coordinated to the individual cylinders are detected, stored and subsequently evaluated whereby a direct indication of the incorrectly operating cylinders may be provided.

While I have shown and described only two embodiments in accordance with the present invention, it is understood that the same is not limited thereto but is susceptible of numerous changes and modifications as known to those skilled in the art, and I therefore do not wish to be limited to the details shown and described herein but intend to cover all such changes and modifications as are encompassed by the scope of the appended claims.

I claim:

1. A method for determining cylinders operating with irregular combustion of an elastically supported multi-cylinder engine, comprising the steps of plotting as a function of time the amplitude of a velocity signal filtered out of the velocity signal of the engine vibrations taking place about the axis of rotation of the internal combustion engine which occur during the combustion operations in the cylinders and alternate with the repetition frequency of the internal combustion engine, a synchronizing pulse coordinated to a predetermined angular position of each operating cycle of the internal combustion engine and the amplitude of the vibration distance signal coordinated to the vibration distance of the engine vibrations which take place about the axis of rotation of the internal combustion engine, and determining from the position of the synchronizing pulse the cylinder or cylinders having an irregular combustion whose coordinated amplitude or amplitudes of the vibration velocity signal is clearly smaller than the amplitudes coordinated to the other cylinders and some of the amplitudes of the vibration distance signal which follow in time are clearly larger than the amplitudes occurring during normal combustion.

2. A method according to claim 1, wherein the synchronizing pulse corresponds to the ignition pulse of a predetermined cylinder.

3. A method according to claim 1, wherein the synchronizing pulse corresponds to the opening or closing operation of one of inlet and exhaust valve of a predetermined cylinder.

4. A method according to claim 1, wherein the synchronizing pulse corresponds to the beginning or end of the fuel injection operation.

5. An apparatus for determining the cylinder or cylinders operating with irregular combustion of an elastically supported multi-cylinder internal combustion engine, comprising velocity pickup means arranged at the engine cylinder block, whose output signal is conducted by way of a band pass filter means matched to the repetition frequency of the internal combustion engine, means for producing a signal corresponding to the vibrational distance, synchronizing pulse pickup means, and multi-channel recorder means having several channels, the output of the band filter means and the signal representing the vibration distance being operatively connected with the inputs of two channels of the recorder means and the output of the synchronizing pulse pickup means being operatively connected with the input of one of the channels of the recorder means.

6. An apparatus according to claim 5, wherein said last-mentioned channel is a further channel.

7. An apparatus according to claim 5, wherein the means for producing a signal representative of the vibration distance includes a pickup means also arranged at the engine block.

8. An apparatus according to claim 5, wherein the output of the synchronizing pulse pickup means is connected with the input of a summing member which is connected by way of its second input and its output with the input of one of said two first-mentioned channels of the recorder means.

9. An apparatus according to claim 5, wherein the means producing a signal representative of the vibration distance includes an integrating means whose input is operatively connected with the output of the velocity pickup means.

10. An apparatus according to claim 5, wherein the velocity pickup means includes an acceleration pickup means with integrating means connected in its output.

* * * * *